United States Patent
Peynot et al.

(10) Patent No.: US 12,534,940 B2
(45) Date of Patent: Jan. 27, 2026

(54) ELECTRONIC VEHICLE HANDLE ASSEMBLY INCLUDING A MECHANICAL SWITCH

(71) Applicant: U-SHIN ITALIA S.p.A., Pianezza (IT)

(72) Inventors: Thomas Peynot, Pianezza (IT); Anthony Guerin, Pianezza (IT); Frédéric Citron, Pianezza (IT); Alessio Gajoni, Pianezza (IT)

(73) Assignee: U-SHIN ITALIA S.p.A., Pianezza (IT)

( * ) Notice: Subject to any disclaimer, the term of this patent is extended or adjusted under 35 U.S.C. 154(b) by 70 days.

(21) Appl. No.: 18/259,651

(22) PCT Filed: Jan. 6, 2022

(86) PCT No.: PCT/EP2022/050210
§ 371 (c)(1),
(2) Date: Jun. 28, 2023

(87) PCT Pub. No.: WO2022/148814
PCT Pub. Date: Jul. 14, 2022

(65) Prior Publication Data
US 2024/0060339 A1    Feb. 22, 2024

(30) Foreign Application Priority Data
Jan. 6, 2021    (EP) .................. 21150431

(51) Int. Cl.
*E05B 81/76*    (2014.01)
*E05B 81/42*    (2014.01)
(Continued)

(52) U.S. Cl.
CPC ........... *E05B 81/76* (2013.01); *E05B 81/42* (2013.01); *E05B 81/90* (2013.01); *E05B 85/18* (2013.01)

(58) Field of Classification Search
CPC ........ E05B 85/10; E05B 85/18; E05B 85/103; E05B 85/107; E05B 81/42; E05B 81/64; E05B 81/76; E05B 81/77; E05B 81/90
See application file for complete search history.

(56) References Cited

U.S. PATENT DOCUMENTS 6,550,103 B2 *  4/2003  Koops ................ E05B 17/0016
                                              292/336.3
6,666,496 B2 * 12/2003  Rettig .................... E05B 79/06
                                              292/336.3

(Continued)

FOREIGN PATENT DOCUMENTS

DE        60015463 T2 *  3/2005
DE    102013102106 A1 *  9/2014 ............. E05B 79/06

(Continued)

OTHER PUBLICATIONS

"Switch" Merriam-Webster.com Dictionary, Merriam-Webster, https://www.merriam-webster.com/dictionary/switch. Accessed Nov. 6, 2024. (Year: 2024).*

(Continued)

*Primary Examiner* — Kristina R Fulton
*Assistant Examiner* — Emily G. Brown
(74) *Attorney, Agent, or Firm* — Oblon, McClelland, Maier & Neustadt, L.L.P.

(57) ABSTRACT

A vehicle door handle assembly includes a housing that sits flush against an outer panel of the vehicle, a rotatable flap housed within the housing, the flap extending along and configured to rotate about a rotation axis between a rest position and a door opening position, a mechanical actuation switch generating an electrical signal to be sent to a vehicle door controller to release the vehicle door. The door assembly includes a cam holder and a cam supported by the cam holder. The cam holder being connected to the flap such that the cam holder is rotatable about the rotation axis and that (Continued)

rotation of the flap causes rotation of the cam holder, rotation of the cam holder causing the cam to activate the switch.

17 Claims, 6 Drawing Sheets

(51) Int. Cl.
    *E05B 81/90*        (2014.01)
    *E05B 85/18*        (2014.01)

(56) References Cited

U.S. PATENT DOCUMENTS

| | | | | |
|---|---|---|---|---|
| 10,458,173 | B2 * | 10/2019 | Fukui | E05F 15/63 |
| 2004/0135380 | A1 | 7/2004 | Bruderick et al. | |
| 2011/0080010 | A1 * | 4/2011 | Gouhara | E05B 79/06 |
| | | | | 292/336.3 |
| 2015/0013403 | A1 * | 1/2015 | Fujiwara | E05B 81/56 |
| | | | | 70/263 |
| 2015/0233153 | A1 * | 8/2015 | Smart | E05B 85/107 |
| | | | | 70/237 |
| 2019/0218832 | A1 * | 7/2019 | Hansen | E05B 81/76 |
| 2020/0308382 | A1 * | 10/2020 | Martens | B32B 27/32 |

FOREIGN PATENT DOCUMENTS

| | | | |
|---|---|---|---|
| DE | 10 2016 218 206 A1 | 3/2018 | |
| EP | 0289715 A1 * | 11/1988 | |
| EP | 1070810 A1 * | 1/2001 | ............. E05B 85/18 |
| EP | 1 111 165 A1 | 6/2001 | |
| ES | 1064403 U * | 3/2007 | |
| JP | 62-248769 A | 10/1987 | |
| WO | WO-2008043710 A2 * | 4/2008 | ............. E05B 7/00 |
| WO | WO-2018019723 A1 * | 2/2018 | |
| WO | WO 2020/020632 A1 | 1/2020 | |

OTHER PUBLICATIONS

Espacenet machine translation of EP 0289715 A1, generated Nov. 14, 2024. (Year: 2024).*
Espacenet machine translation of EP 1070810 A1, generated Nov. 6, 2024. (Year: 2024).*
"Border." Merriam-Webster.com Dictionary, Merriam-Webster, https://www.merriam-webster.com/dictionary/border. Accessed Oct. 10, 2025. (Year: 2025).*
International Search Report & Written Opinion mailed on May 2, 2022 in PCT/EP2022/050210 filed on Jan. 6, 2022 (12 pages).
Office Action issued on Aug. 27, 2025 in Chinese Patent Application No. 202280009113.0 (with English translation), 18 pages.

* cited by examiner

ELECTRONIC VEHICLE HANDLE ASSEMBLY INCLUDING A MECHANICAL SWITCH

The invention relates to a door opening assembly to control the opening of a vehicle door, in particular in the case of automated door latches that are controlled via electric means without mechanically actuated door handle lever or knob.

Automated door latches selectively lock or release vehicle door panels in an automated fashion. By automated door latches are herein designated door latches where the user does not provide the energy to actuate the latch through grasping and moving a handle lever, knob or other.

Once the door panel is released, the user or an electric panel actuator swings or slides the panel to grant physical access the vehicle. Automated door latches, under normal circumstances, do not require bulging handle levers on the exterior surface of the vehicle. The air drag of the vehicle can consequently be reduced, while the visual aspect of the vehicle can be streamlined.

Most automated door latches comprise an electric actuator that sets a bolt, hook or lever in motion upon reception of an actuation signal so as to release the vehicle door. Such an electric actuator can be activated using an electrical or a mechanical switch. The electrical switch has the advantage, compared to a mechanical switch, of saving space in the door assembly as it there is no need to provide room required by the stroke of a mechanical part to be displaced. However, unlike a mechanical switch, it is costly and complexifies the electronics of the door assembly.

The purpose of the invention is therefore to provide an automated vehicle door handle assembly that less manufacturing costs and requires less mounting space and less space for activation.

To that end, the invention concerns a vehicle door handle assembly comprising
- a housing that sits flush against an outer panel of the vehicle,
- a rotatable flap housed within said housing, said flap extending along and configured to rotate about a rotation axis between a rest position and a door opening position,
- a mechanical actuation switch generating an electrical signal to be sent to a vehicle door controller to release the vehicle door, characterized in that it also comprises a cam holder and a cam supported by the cam holder, said cam holder being connected to the flap such that the cam holder is rotatable about the rotation axis and that rotation of the flap causes rotation of the cam holder, rotation of the cam holder causing the cam to activate said mechanical actuation switch.

Owing to the fact that the assembly comprises a cam holder connected to the flap such that the cam holder is rotatable about the rotation axis and that rotation of the flap causes rotation of the cam holder and activation of said switch, activation of the switch can be obtained even if very little space is available for the flap to rotate, i.e. little stroke space is available. Such an arrangement indeed only requires space along the rotation axis and not along the flap stroke direction.

The vehicle door handle assembly may present one or several of the below described aspects taken alone or in combination.

According to one embodiment, the cam holder comprises for example a cam lever extending along a longitudinal direction, said lever comprising a first end hinged on the rotation axis of the flap and a second end, opposite to the first, supporting the cam. This particular configuration allows to take advantage on the lever constructions and transform a very small pivoting movement of the flap into sufficient movement of the cam to activate the switch.

According to another embodiment, the rotatable flap is in particular sensibly planar and is delimited, on the one hand, by two parallel rectilinear longitudinal sides extending along the rotation axis and, on the hand, by two parallel rectilinear lateral sides extending along a direction that is sensibly perpendicular to the rotation axis. A flap of such as shape takes very little space and is both easy to manufacture and manipulate for a user.

In order to further limit the space taken by the handle assembly, especially in the flap stroke direction, rotation of the cam holder induces a movement of the cam which follows the movement of a longitudinal side of the flap.

In order to further limit the space taken by the handle assembly, especially in the flap stroke direction, the cam lever is substantially parallel to a lateral side of the flap and is located adjacent to said lateral side of the flap.

In order to further limit the space taken by the handle assembly, the axis about which the cam holder is rotatable comprises for example a pin stemming from the first end of the cam lever configured to be inserted into a hole opened in the flap along the rotation axis, such that the cam lever is substantially parallel to a lateral side of the flap.

According to a further aspect, a second pin inserted in a hole of the cam lever located next to the second end of the cam lever is also inserted in a second hole of the flap, located opposite the first hole along the lateral side of the flap.

In order to yet further limit the space taken by the handle assembly, the length of the cam lever is in particular at least the same as the length of a lateral side of the flap.

According to a further aspect, the mechanical actuation switch comprises for instance a flexible blade and wherein during rotation of the cam holder, a contact surface of the cam comes into contact with and pushes the blade in at least one direction that is transverse to the rotation axis.

According to another aspect, the blade may be oriented perpendicular to the rotation axis of the flap. This particular configuration also allows to transform a very small movement of the flap into sufficient movement to activate the switch.

According to another aspect, the mechanical actuation switch comprises for example a push button and wherein during rotation of the cam holder, the blade comes into contact with and pushes the push button, said pushing of the push button generating an electrical signal to be sent to a vehicle door controller to release the vehicle door.

Furthermore, the contact surface of the cam may present a slope joining two sensibly rectilinear surfaces. Thanks to this configuration, the gradient of the slope determines the stroke speed to push the push button.

The housing of the door handle assembly comprises for example a bowl-shaped reception surface, delimiting a volume giving access to the rotatable flap.

The rotatable flap in rest position and the rotatable flap in door opening position form for example an angle comprised between 2° degrees and 6° degrees.

Moreover, the distance between the rotatable flap in rest position and the rotatable flap in door opening position is less than 6 mm, preferably less than 4 mm.

Should the electric current become unavailable for any reason, the handle assembly also comprises a back-up release mechanism comprising a cable connected, to the door latch mechanism, causing mechanical actuation of the door latch mechanism to release the vehicle door, said back-up release mechanism being configured to be actuated by a key inserted in a keyhole located inside the reception surface.

In order for the handle to be pleasant to the touch for the user but resistant enough, the rotatable flap comprises for example a section made of elastomer, such as rubber, overmolded on a section made of hard plastic, for example polypropylene.

BRIEF DESCRIPTION OF THE FIGURES

The invention will be better understood in view of the following description, referring to the annexed Figures in which.

DETAILED DESCRIPTION

Figure 1:
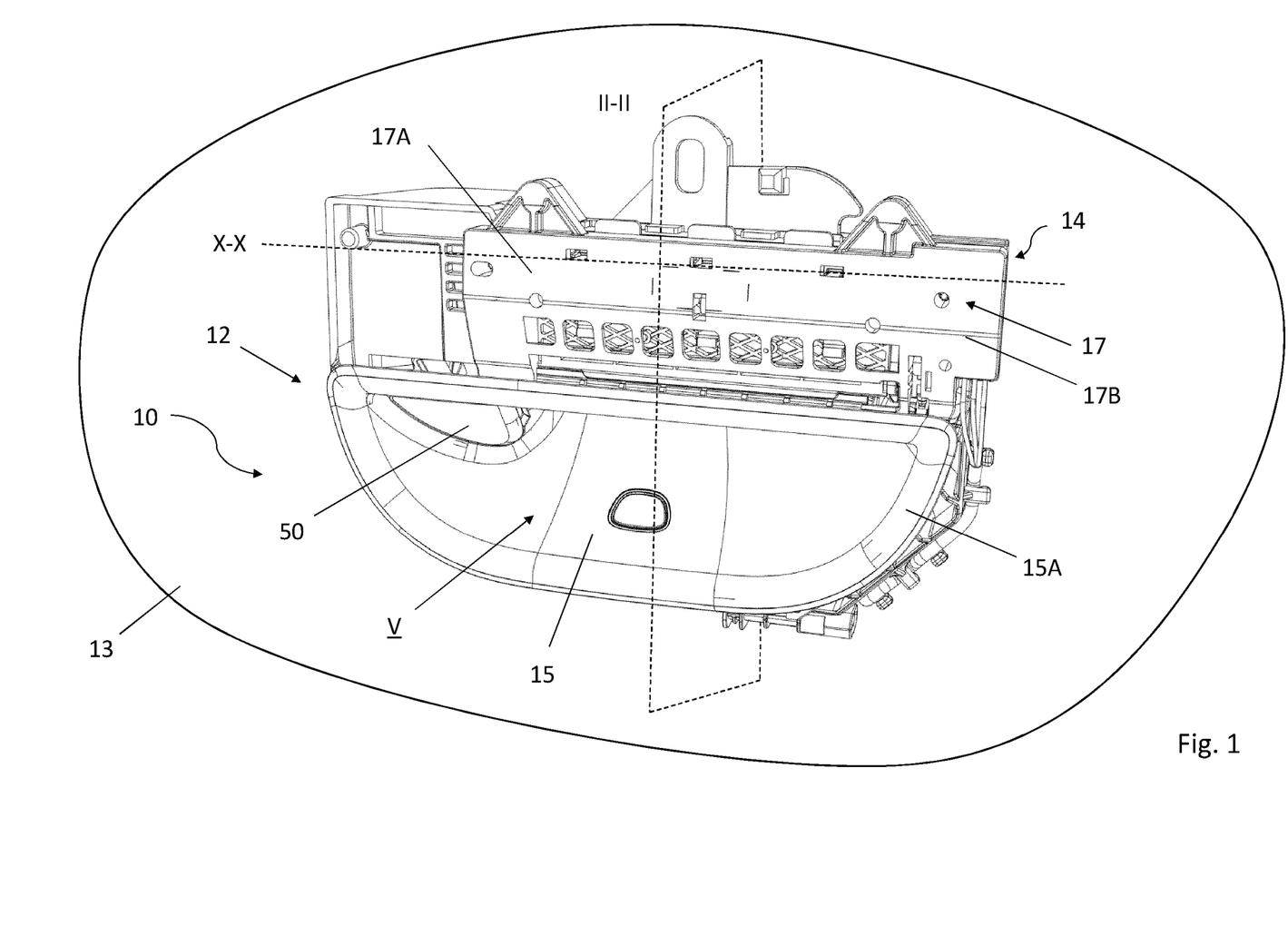
FIG. 1 is a view in perspective of a vehicle door handle door assembly according to a particular embodiment of the invention.
Figure 2:
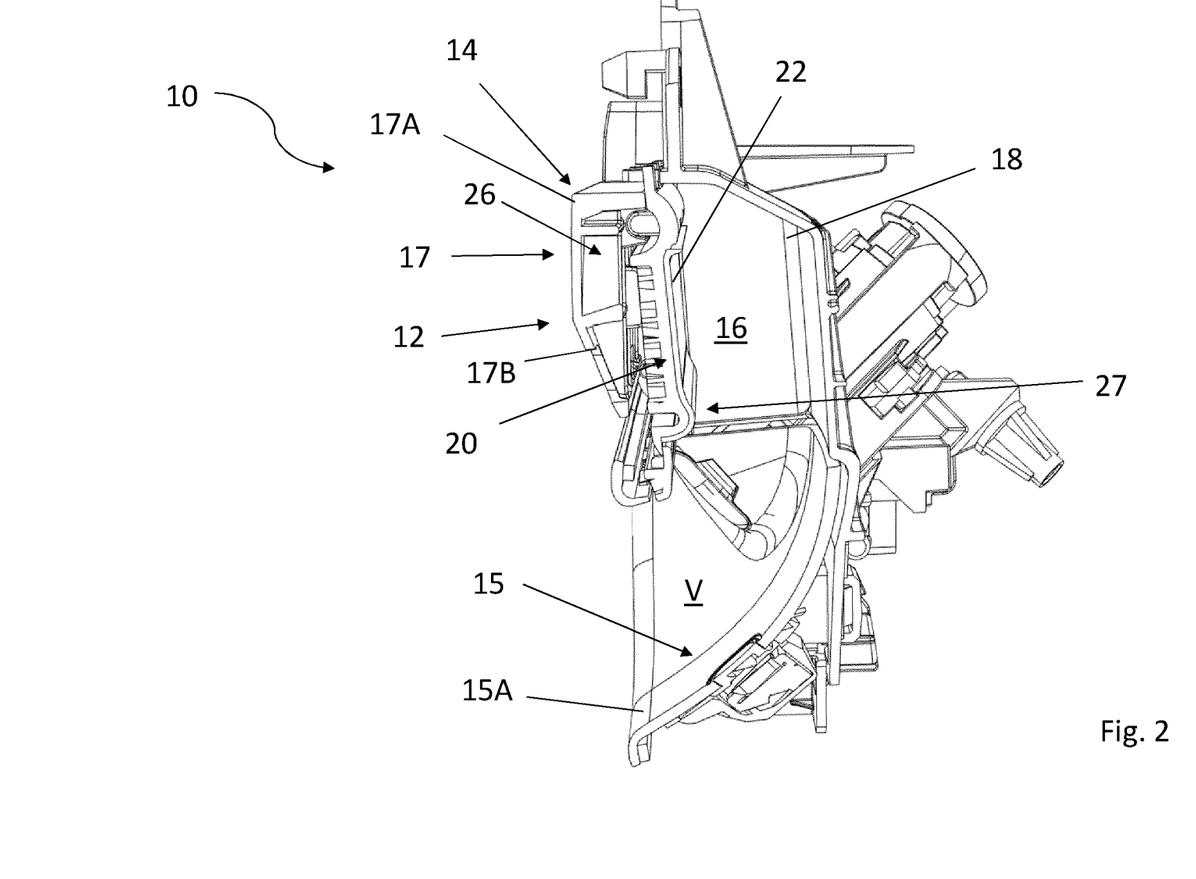
FIG. 2 is cut view along plane II-II of FIG. 1.

A vehicle door assembly 10 according a particular embodiment of the invention has been shown on FIGS. 1 and 2.

Door assembly 10 comprises a housing 12 that sits flush against an outer panel 13 of the vehicle.

The housing comprises an upper casing 14 and a bowl-shaped reception surface 15, delimiting a volume V giving access to the inside of the upper casing 14. Here, as can be seen on FIG. 1, reception surface 15 is delimited by a frame 15A having a rectilinear section, the two extremities of which are joined by a U-shaped section.

The upper casing 14 is substantially rectangular in shape and includes a space 16 between its front wall 17 and its back wall 18, which is substantially parallel to front wall 17. Rotatable flap 20 is housed within space 16.

As can be seen on FIG. 2, front wall comprises an upper section 17A which is substantially planar and flush against the outer panel 13 of the vehicle and a lower section 17B which is substantially planar but transverse to upper section 17A. More particularly, lower section 17B joins upper section 17A and reception surface 15 and is connected to reception surface 15 behind the rectilinear section of frame 15A. Hence, the distance between lower section 17B of front wall 17 and back wall 18 is lower than the distance between upper section 17A and back wall 18.

As can be seen on FIG. 2, reception surface 15 is prolonged by back wall 18. Space 16 is connected to the volume V in such a way that the hand of the handle user can be inserted inside volume V and the remaining of space 16, in order to actuate rotatable flap 20. To be more precise, the hand is inserted fingers first inside volume V and moves up inside space 16. Here, space 16 has a width less than 50 mm, preferably above 20 mm.

Owing to the narrow space available, most of space 16 is left hollow to allow passage for the user's hand. Hence, rotatable flap 20 is placed as close as possible to front wall 17 of the housing.

Figure 3:
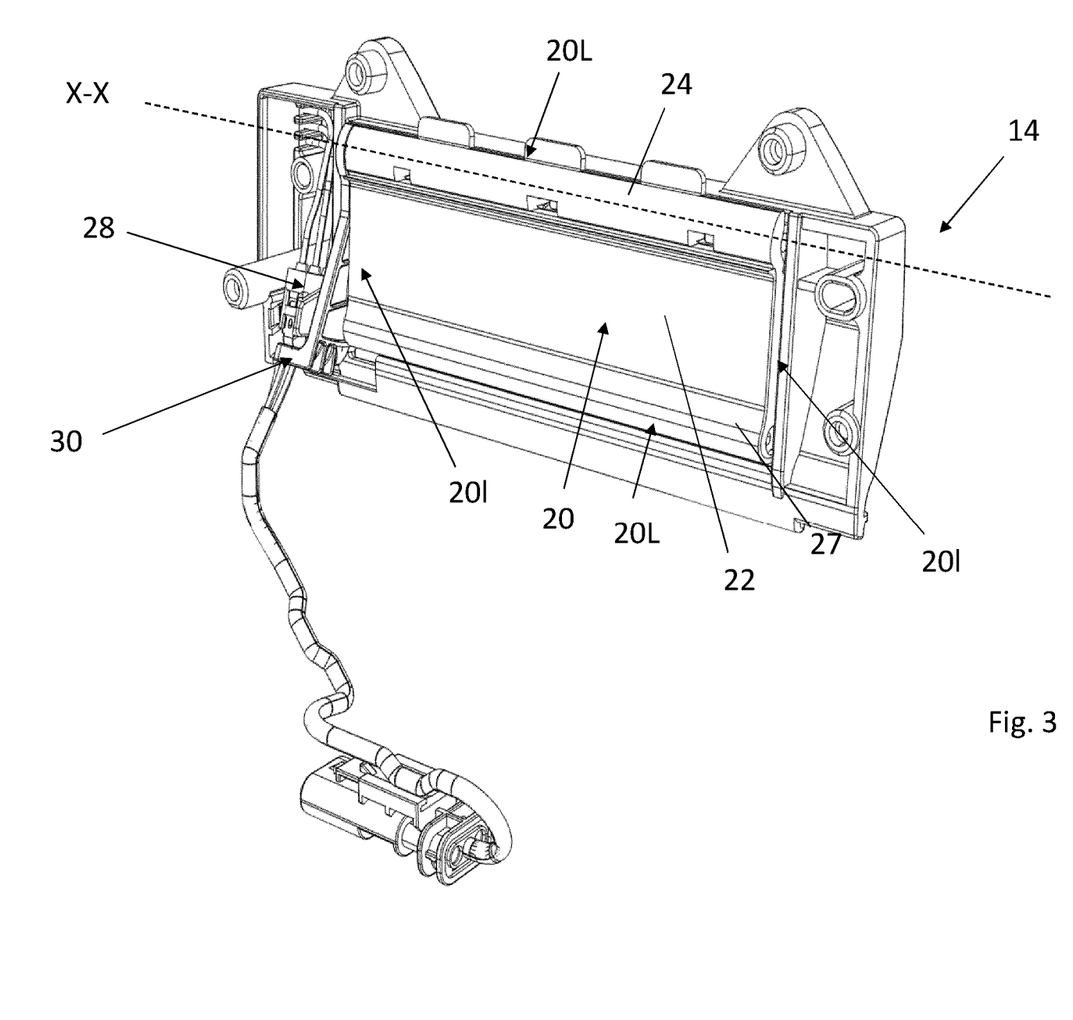
FIG. 3 is a view in perspective of parts of the vehicle door handle door assembly of FIG. 1.
Figure 4:
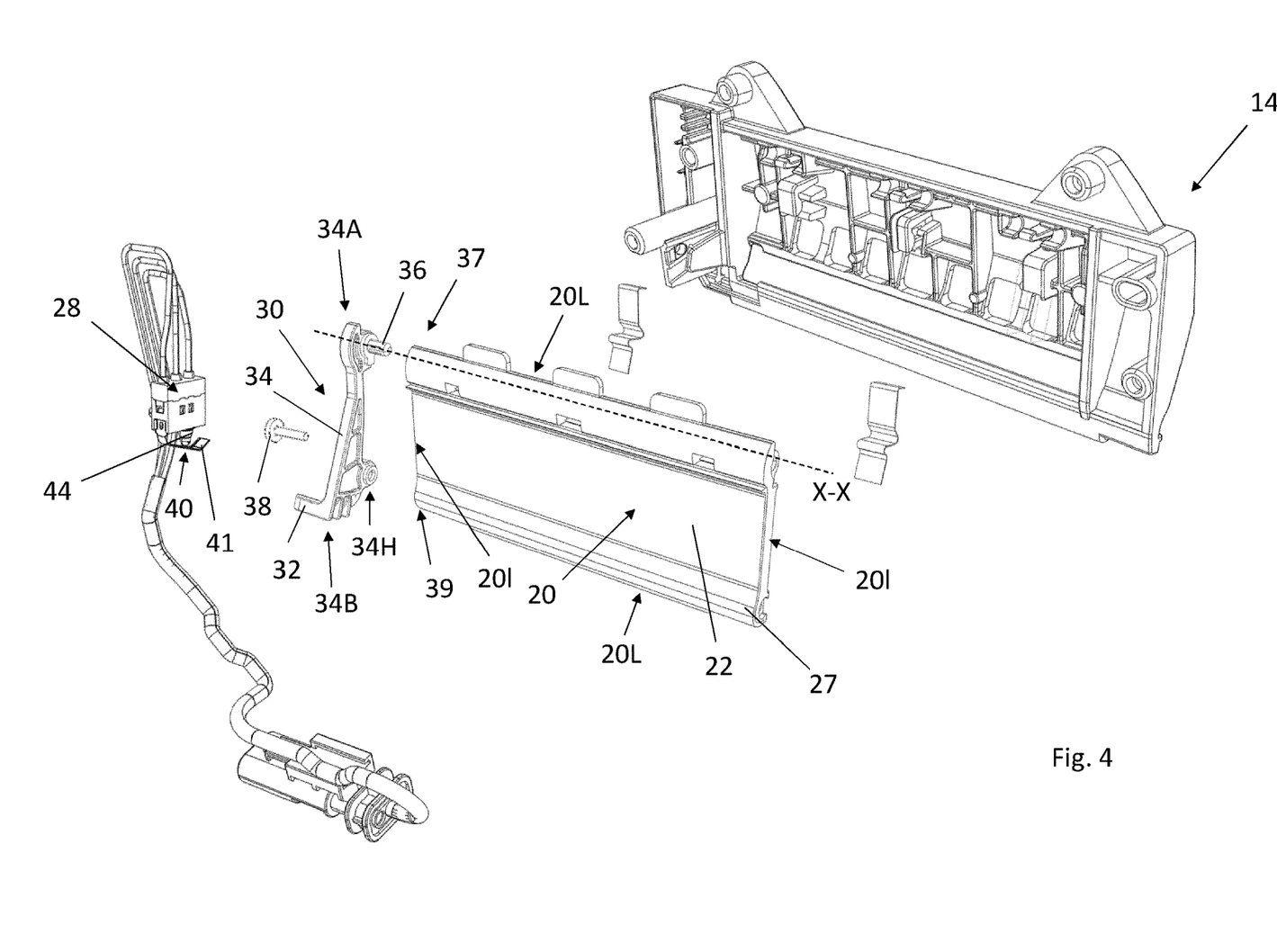
FIG. 4 is a split view of the elements of FIG. 3.

Turning now to FIGS. 3 and 4, rotatable flap 20 extends along a rotation axis X-X (perpendicular to the plane of FIG. 2). To be more precise, as can be seen best on FIG. 4, rotatable flap 20 is sensibly planar and is delimited, on the one hand, by two parallel rectilinear longitudinal sides 20L extending along the rotation axis and, on the hand, by two parallel rectilinear lateral sides 201 extending along a direction that is sensibly perpendicular to the rotation axis X-X.

Rotatable flap 20 comprises a first section 22 made of elastomer, such as rubber, overmolded on a second section 24 made of hard plastic, for example polypropylene. First section 22 is placed facing space 26 so that a hand that is inserted into space 16 first comes in contact with a surface that is pleasant to the touch.

Preferably, rotatable flap 20 comprises at its longitudinal side 20L that is closest to the reception surface 15, i.e. closest to the entrance to space 16 and proximate to volume V, a boss 27, that extends preferably along the whole longitudinal side 20L. This boss 27 allows the user to easily feel and push onto the rotatable flap 20 as soon as their hand is inserted into space 16. Preferably, the distance between the entrance of volume V and boss 17 is less than 15 mm.

Rotatable flap 20 is configured to rotate about rotation axis X-X between a rest position, which corresponds to the position shown on the Figures, and a door opening position (not shown).

In the present embodiment, the width of the remaining space 26 between rotatable flap 20 and front wall 17 of the housing, which corresponds to the distance between lower section 17B and back wall 18, minus the width of space 16 left to insert the user's fingers and the width of rotatable flap 20 itself, is less than 6 mm. Hence, the stroke of rotatable flap 20 is constrained within this distance. For example, the stroke of rotatable flap 20, i.e. the distance between the rotatable flap 20 in rest position and the rotatable flap 20 in door opening position is less than 6 mm, preferably less than 4 mm. The rotatable flap 20 in rest position and the rotatable flap 20 in door opening position form an angle comprised between 2° degrees and 6° degrees.

However, the invention makes it possible for said rotatable flap 20, even if its stroke is so limited, to activate a mechanical actuation switch 28, generating an electrical signal to be sent to a vehicle door controller (not shown) to release the vehicle door. More particularly, the invention makes it possible to have a longer stroke for the mechanical actuation switch 28 than the rotatable flap 20.

To that end, the handle assembly 10 also comprises a cam holder 30 and a cam 32 supported by the cam holder 30. Cam holder 30 is connected to the flap 20 such that it is rotatable about the rotation axis X-X.

In the present embodiment, the cam holder 30 comprises a cam lever 34 extending along a longitudinal direction, said lever comprising a first end 34A hinged on the rotation axis X-X of the flap 20 and a second end 34B, opposite to the first, supporting the cam 32.

More specifically, the axis around which the cam holder 30 is rotatable is formed by a pin 36 stemming from the first end 34A of the cam lever inserted into a hole 37 opened in the flap 20 along the rotation axis X-X so that the cam lever 32 is substantially parallel to a lateral side 201 of the flap 20. A second pin 38 inserted in a hole 34H of the cam lever 34 located next to the second end 34B of the cam lever 34 is also inserted in a second hole 39 of the flap 20, located opposite the first hole 37 along the lateral side 201 of the flap.

Here, as can be seen on FIGS. 3 and 4, the length of the cam lever 34 is at least the same as the length of a lateral side 201 of the flap, here sensibly the same length.

Figure 5:
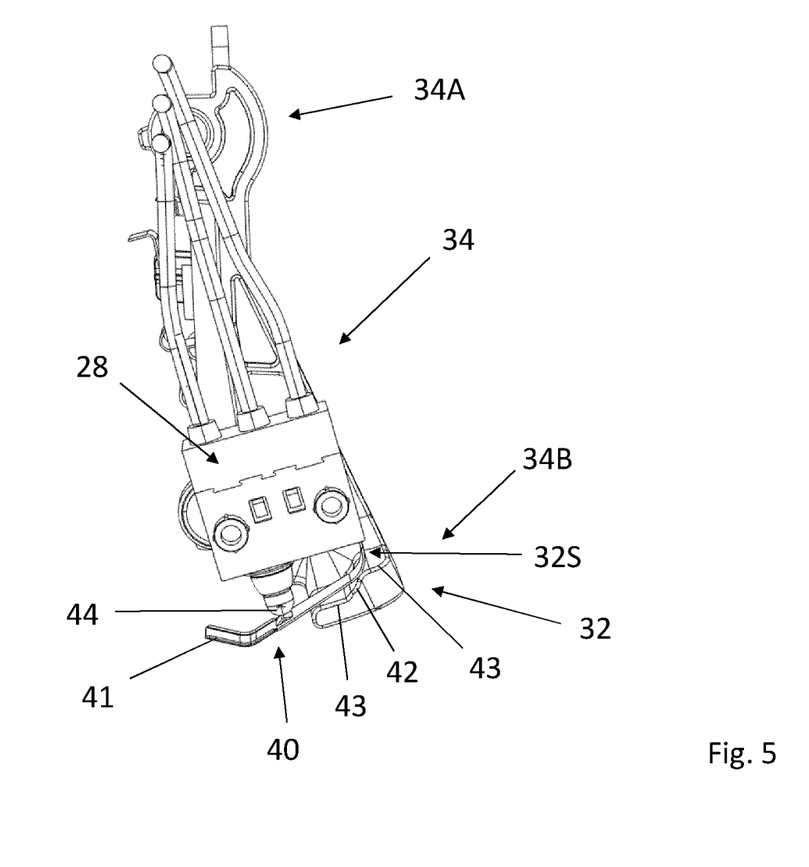
FIG. 5 is a side view of a mechanical switch, a cam lever and a flap of the vehicle door handle door assembly of FIG. 1.

Turning now to FIGS. 4 and 5, handle assembly 10 is configured so that that rotation of the flap 20 causes rotation of the cam holder 30, rotation of the cam holder 30 causing the cam 32 to activate mechanical actuation switch 28.

More specifically, mechanical actuation switch 28 comprises a flexible blade 40 such that during rotation of the cam holder 30, a contact surface 32S of the cam 32 comes into contact with and pushes the blade 40 in at least one direction that is transverse to the rotation axis X-X. Here, the blade 40 extends along a longitudinal axis which is sensibly perpendicular to the rotation axis X-X of the flap. One end 41 of the blade 40 is recurved.

As can be better seen on FIG. 5, the contact surface 32S of the cam 32 is formed of a slope 42 joining two sensibly rectilinear surfaces 43. Thanks to this configuration, the gradient of the slope 42 determines the stroke speed to push the push button 44.

The blade 40 first comes into contact with the first rectilinear surface 43, which does not actuate the switch 28 yet. Activation of the switch 28 becomes possible when the blade 40 comes into contact with the slope 42, which corresponds to the point when the blade 40 also comes into contact with a push button 44 placed opposite blade 40. Hence, during rotation of the cam holder 30, blade 40 comes into contact with and pushes the push button 44. Pushing of the push button 44 generates an electrical signal to be sent to the vehicle door controller to release the vehicle door.

Figure 6:
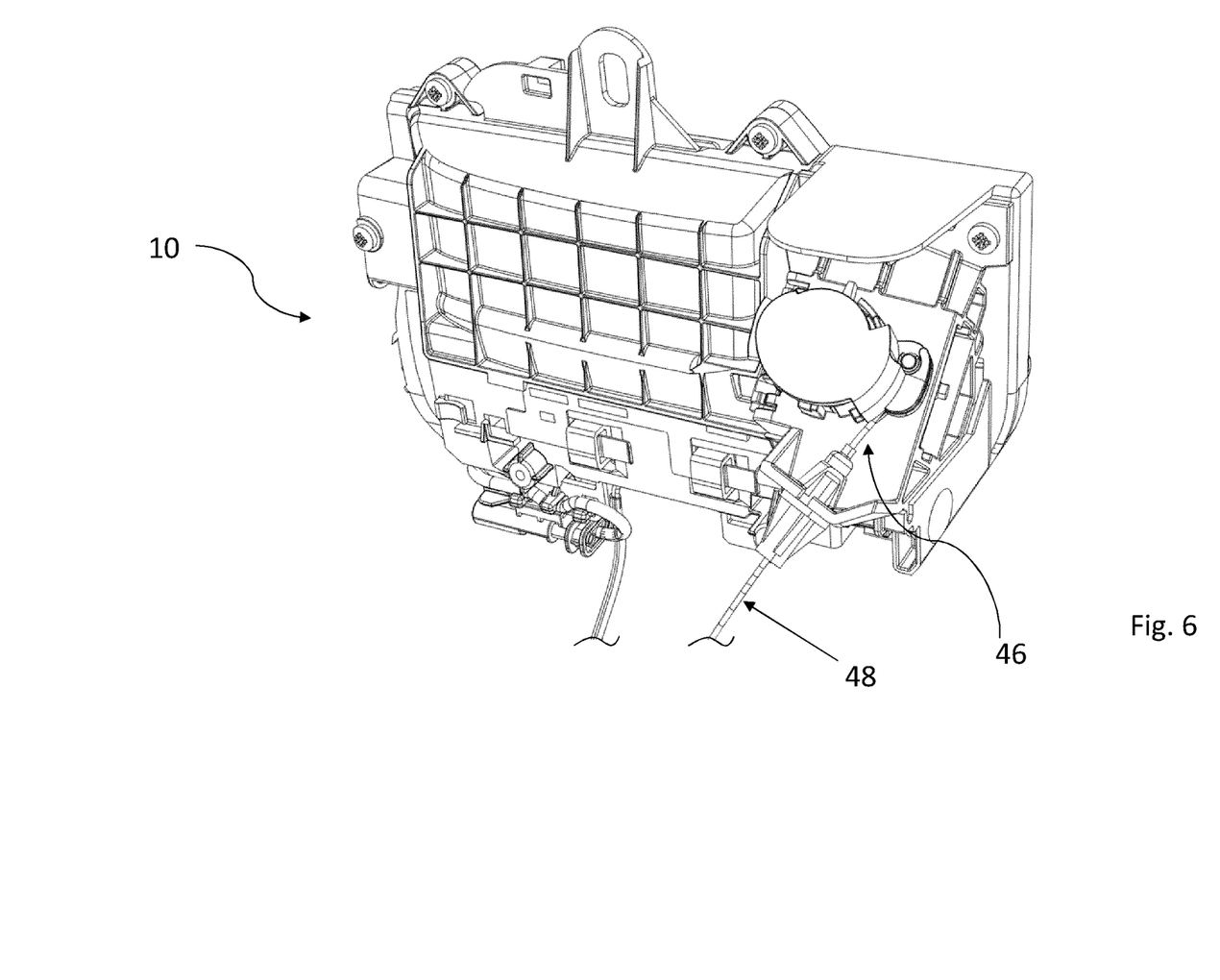
FIG. 6 is a view in perspective of a vehicle door handle door assembly according to a particular embodiment of the invention, taken from another angle.

As can be seen on FIG. 6 showing the backside of door handle assembly 10 compared to FIG. 1, it also comprises a back-up release mechanism 46 that enables a user to open the vehicle door in case no electric current is available, such as a power shortage in the vehicle.

Back-up release mechanism 46 comprises a cable 48 connected to the door latch mechanism (not shown), causing mechanical actuation of the door latch mechanism to release the vehicle door.

Back-up release mechanism 46 is configured to be actuated by a key (not shown) inserted in a keyhole located inside the reception surface 15. Here, as can be seen on FIG. 1, the keyhole is hidden by a hiding wall 50 which can be displaced to gain access to the keyhole Thus one clearly understands that with little space 16 between the flap 20 and the: back wall of the upper casing 18, the invention achieves a quite compact design of a door handle assembly 10 for an electrically controlled door latch. This is in particular achieved thanks to the specific location of the mechanical actuation switch 28 which is at one side of the flap 20 and oriented with its longitudinal axis perpendicular to the rotation axis X-X of the flap 20 and thanks to the elongated cam holder 30 which amplifies a small pivoting movement to get the necessary stroke to activate the push button 44 of the mechanical switch 28.

LIST OF REFERENCES

10: Vehicle door assembly
12: Housing
13: Outer panel of the vehicle
14: Upper casing
15: Reception surface
15A: Reception surface frame
16: Housing space
17: Front wall of the upper casing
17A: Upper section of the front wall
17B: Lower section of the front wall
18: Back wall of the upper casing
20: Rotatable flap
20L: Longitudinal side of the flap
201: Lateral side of the flap
22: First section of the flap
24: Second section of the flap
26: Remaining space
27: Flap boss
28: Mechanical actuation switch
30: Cam holder
32: Cam
32S: Contact surface of the cam
34: Cam lever
34A: First end of the cam lever
34B: Second end of the cam lever
34H: Hole of the cam holder
36: First pin
37: Flap hole
38: Second pin
39: Second flap hole
40: Flexible blade
42: Slope of the cam
43: Rectilinear surface
44: Switch push button
46: Back-up release mechanism
48: Cable
50: Hiding wall
V: Volume delimited by the reception surface

The invention claimed is:

1. A vehicle door handle assembly comprising:
a housing that sits flush against an outer panel of the vehicle,
a rotatable flap housed within said housing, said flap extending along and configured to rotate about a rotation axis between a rest position and a door opening position,
a mechanical actuation switch generating an electrical signal to be sent to a vehicle door controller to release the vehicle door,
wherein the vehicle door handle further comprises a cam holder and a cam supported by the cam holder, said cam holder being connected to the flap such that the cam holder is rotatable about the rotation axis and that rotation of the flap causes rotation of the cam holder, rotation of the cam holder causing the cam to activate said mechanical actuation switch,
wherein the cam holder comprises a cam lever extending along a longitudinal direction, said cam lever comprising a first end hinged on the rotation axis of the flap and a second end, opposite to the first, supporting the cam,
wherein the rotatable flap is substantially planar and is delimited by two parallel rectilinear longitudinal sides extending along the rotation axis and by two parallel rectilinear lateral sides extending along a direction that is substantially perpendicular to the rotation axis, and
wherein the axis about which the cam holder is rotatable is a pin stemming from the first end of the cam lever configured to be inserted into a hole opened in the flap along the rotation axis, such that the cam lever is substantially parallel to and bordering one of the two parallel rectilinear lateral sides of the flap.

2. The vehicle door handle assembly according to claim 1, wherein rotation of the cam holder induces a movement of the cam which follows the movement of a longitudinal side of the flap.

3. The vehicle door handle assembly according to claim 1, wherein the cam lever is substantially parallel to a lateral side of the flap and is located adjacent to said lateral side of the flap.

4. The vehicle door handle assembly according to claim 3, wherein the length of the cam lever is at least the same as the length of a lateral side of the flap.

5. The vehicle door handle assembly according to claim 1, wherein a second pin inserted in a hole of the cam lever located next to the second end of the cam lever is also inserted in a second hole of the flap, located opposite the first hole along the lateral side of the flap.

6. The vehicle door handle assembly according to claim 1, wherein the mechanical actuation switch comprises a flexible blade and wherein during rotation of the cam holder, a contact surface of the cam comes into contact with and pushes the blade in at least one direction that is transverse to the rotation axis.

7. The vehicle door handle assembly according to claim 6, wherein, the blade is oriented sensibly perpendicularly to the rotation axis of the flap.

8. The vehicle door handle assembly according to claim 6, wherein the mechanical actuation switch comprises a push button and wherein during rotation of the cam holder, the blade comes into contact with and pushes the push button, said pushing of the push button generating an electrical signal to be sent to the vehicle door controller to release the vehicle door.

9. The vehicle door handle assembly according to claim 1, wherein a contact surface of the cam is formed of a slope joining two substantially rectilinear surfaces.

10. The vehicle door handle assembly according to claim 1, wherein the housing comprises a bowl-shaped reception surface, delimiting a volume giving access to the rotatable flap.

11. The vehicle door handle assembly according to claim 1, wherein the rotatable flap in the rest position and the rotatable flap in the door opening position form an angle comprised between 2 degrees and 6 degrees.

12. The vehicle door handle assembly according to claim 1, wherein a distance between the rotatable flap in rest position and the rotatable flap in door opening position is less than 6 mm.

13. The vehicle door handle assembly according to claim 1, further comprising a back-up release mechanism comprising a cable connected to a door latch mechanism, causing mechanical actuation of the door latch mechanism to release the vehicle door, said back-up release mechanism being configured to be actuated by a key inserted in a keyhole located inside a reception surface.

14. The vehicle door handle assembly according to claim 1, wherein the rotatable flap comprises a section made of elastomer, overmolded on a section made of hard plastic.

15. The vehicle door handle assembly according to claim 1, wherein a distance between the rotatable flap in rest position and the rotatable flap in door opening position is less than 4 mm.

16. The vehicle door handle assembly according to claim 1, wherein the rotatable flap comprises a section made of rubber, overmolded on a section made of polypropylene.

17. The vehicle door handle assembly according to claim 1, wherein a length of the cam lever in the longitudinal direction that extends parallel to the lateral side of the flap is at least a same length as the lateral side of the flap.

* * * * *